(12) United States Patent
Wilson (10) Patent No.: US 10,589,293 B2
(45) Date of Patent: Mar. 17, 2020

(54) MODERATELY OXIDIZED POLYSACCHARIDE DEPRESSANTS FOR USE IN IRON ORE FLOTATION PROCESSES

(71) Applicant: Kemira Oyj, Helsinki (FI)

(72) Inventor: Duane C. Wilson, Marietta, GA (US)

(73) Assignee: Kemira OYJ, Helsinki (FI)

( * ) Notice: Subject to any disclaimer, the term of this patent is extended or adjusted under 35 U.S.C. 154(b) by 525 days.

(21) Appl. No.: 15/275,869

(22) Filed: Sep. 26, 2016

(65) Prior Publication Data

US 2017/0100724 A1 Apr. 13, 2017

Related U.S. Application Data

(60) Provisional application No. 62/239,090, filed on Oct. 8, 2015.

(51) Int. Cl.

| | | |
|---|---|---|
| *C08B 31/18* | (2006.01) | |
| *B03D 1/016* | (2006.01) | |
| *B03D 1/02* | (2006.01) | |
| *C08B 37/00* | (2006.01) | |
| *C08L 3/10* | (2006.01) | |
| *C08L 5/00* | (2006.01) | |

(52) U.S. Cl.
CPC .............. *B03D 1/016* (2013.01); *B03D 1/02* (2013.01); *C08B 31/18* (2013.01); *C08B 37/00* (2013.01); *C08L 3/10* (2013.01); *C08L 5/00* (2013.01); *B03D 2201/06* (2013.01); *B03D 2203/04* (2013.01)

(58) Field of Classification Search
CPC ............ C08B 31/18; B03D 1/016; B03D 1/02
See application file for complete search history.

(56) References Cited

U.S. PATENT DOCUMENTS

| | | | | |
|---|---|---|---|---|
| 4,545,898 A | * | 10/1985 | Hellsten | B03D 1/008 209/166 |
| 4,808,301 A | | 2/1989 | Hansen et al. | |
| 6,130,328 A | * | 10/2000 | Shimpo | C08B 15/02 536/105 |
| 2004/0182576 A1 | * | 9/2004 | Reddy | C09K 8/12 166/295 |

(Continued)

FOREIGN PATENT DOCUMENTS

| | | |
|---|---|---|
| CN | 101892024 | 2/2012 |
| CN | 102443071 | 5/2012 |

(Continued)

OTHER PUBLICATIONS

International Search Report for PCT/US2016/053700, dated Nov. 17, 2016.

*Primary Examiner* — Ellen M McAvoy
(74) *Attorney, Agent, or Firm* — Eversheds Sutherland (US) LLP (57) ABSTRACT

Depressants comprising a moderately oxidized polysaccharide having about 0.05 to about 4.5 mmol of anionic charge per gram at a pH of about 6 to about 7, or about 0.2 to about 5 mmol of anionic charge per gram at a pH of about 10 to about 11.2, are provided. Also disclosed are processes for enriching a desired mineral from an ore comprising the desired mineral and gangue, wherein the process comprises carrying out a flotation process in the presence of one or more of the depressants.

20 Claims, 5 Drawing Sheets

(56) References Cited

U.S. PATENT DOCUMENTS

| | | | | |
|---|---|---|---|---|
| 2007/0015678 A1* | 1/2007 | Rodrigues | ............ | C02F 5/02 |
| | | | | 510/320 |
| 2007/0261998 A1* | 11/2007 | Crane | ............ | B03D 1/016 |
| | | | | 209/167 |
| 2009/0054639 A1* | 2/2009 | Dournel | ............ | C08B 31/18 |
| | | | | 536/105 |
| 2012/0070554 A1* | 3/2012 | Dournel | ............ | C08B 31/18 |
| | | | | 426/442 |
| 2015/0021236 A1* | 1/2015 | Bernardis | ............ | B03D 1/008 |
| | | | | 209/166 |
| 2015/0040936 A1* | 2/2015 | Baghdadli | ............ | A61Q 5/002 |
| | | | | 132/202 |
| 2015/0196926 A1* | 7/2015 | Moreira Da Costa | ............ | |
| | | | | B03D 1/016 |
| | | | | 209/167 |
| 2015/0290659 A1* | 10/2015 | De Lima | ............ | B03D 1/01 |
| | | | | 209/166 |
| 2016/0167001 A1* | 6/2016 | Barton | ............ | C08B 31/18 |
| | | | | 252/186.42 |

FOREIGN PATENT DOCUMENTS

| | | |
|---|---|---|
| CN | 103030699 | 4/2013 |
| CN | 104624383 | 5/2015 |

\* cited by examiner

MODERATELY OXIDIZED POLYSACCHARIDE DEPRESSANTS FOR USE IN IRON ORE FLOTATION PROCESSES

FIELD OF THE ART

The present disclosure generally relates to depressants for use in mineral ore flotation processes, particularly reverse cationic flotation processes.

BACKGROUND

Although iron is the fourth most abundant element in the Earth's crust, the vast majority is bound in silicate or, more rarely, carbonate minerals. The thermodynamic barriers to separating pure iron from these minerals are formidable and energy intensive, therefore common sources of iron used by human industry exploit comparatively rarer high-grade iron oxide minerals, primarily hematite. Most reserves of such high-grade ore have now been depleted, leading to development of lower-grade iron ore sources, for example, magnetite and taconite. The iron content of these lower-grade ores may be concentrated (upgraded) to a higher iron content through various concentration (beneficiation) processes, for example, to meet the quality requirements of iron and steel industries.

The processing of lower grade ore sources involves the removal of gangue, which are the unwanted minerals (such as silicates and carbonates) that are an intrinsic part of the ore rock itself. In these beneficiation processes, the gangue is separated using techniques like crushing, grinding, milling, gravity or heavy media separation, screening, magnetic separation, and/or froth flotation to improve the concentration of the desired minerals and remove impurities.

One such beneficiation technique is froth flotation. In froth flotation the ore is ground to a size sufficiently small to liberate the desired mineral or minerals from the gangue. The ground ore is combined with water to generate a slurry containing the mineral particles and the gangue particles. The slurry is then aerated, such as in a tank or column called a flotation cell. Froth flotation physically separates the ground particles based on differences in the ability of air bubbles to selectively adhere to specific mineral surfaces in the slurry. The particles with attached air bubbles are carried to the surface of the slurry, forming a froth that may be removed, while the particles that remain completely wetted stay in the solid/liquid phase.

An additional step that may be utilized in combination with the flotation process involves the removal of the ultra-fine particles by desliming. Ultra-fine particles are generally defined as those less than 5 to 10 microns in diameter. The desliming process may be accompanied by or followed by a flocculation step or some other type of settling step, such as the use of a cyclone separating device. This step is typically followed by a flotation step wherein gangue materials are separated from the desired mineral or minerals in the presence of collectors and/or frothers.

The chemistry of the slurry can be modified to control or enhance how certain particles interact with the bubbles or, alternatively, settle to the bottom. For example, "collectors," typically surfactants, can be added to the slurry to interact with the surface of certain particles, causing an increase in the surface hydrophobicity of the particle and facilitating flotation. "Depressants" can be added to the slurry to selectively interact with the surface of certain particles to reduce the surface hydrophobicity and inhibit the flotation, i.e., facilitate the depression, of that type of particle.

In mineral flotation systems, it is common to depress or hold down the undesirable gangue materials while floating the desirable mineral or minerals. In differential or reverse flotation systems, it is common to depress or hold down the desired mineral or minerals while floating the undesirable gangue. That is, the normal flotation system is reversed, with the silicate being enriched in the flotate and the iron ore in the bottom fraction. Such reverse froth flotation systems are disclosed in U.S. Pat. No. 4,732,667.

Common depressants include materials derived from natural substances such as gums, dextrins and starches. See U.S. Pat. No. 3,292,780 to Frommer et al., and U.S. Pat. No. 3,371,778 to Iwasaki and U.S. Pat. No. 4,339,331.

Synthetic depressants have been developed for use in the separation of gangue from desirable minerals, for example, as described in U.S. Pat. Nos. 4,360,425 and 4,289,613, 2,740,522, 3,929,629, and 4,808,301.

With the use of depressants in reverse or differential flotation systems, some portion of the desired minerals will inadvertently be removed with the gangue. That portion of the valuable mineral or minerals that is inadvertently removed with the gangue is normally permanently lost from the process and can have a significant economic impact. Even a small decrease in the amount of desired mineral or minerals that are inadvertently floated with the gangue can therefore result in significant economic benefits.

BRIEF SUMMARY

Disclosed herein are depressants comprising a moderately oxidized polysaccharide having about 0.05 to about 4.5 mmol of anionic charge per gram at a pH of about 6 to about 7, and about 0.2 to about 5 mmol of anionic charge per gram at a pH of about 10 to about 11.2. Also disclosed herein are depressants prepared by heating a polysaccharide, one or more bases and one or more oxidizing agents in water, as well as compositions comprising the depressants and a solvent. Processes for enriching a desired mineral from an ore having the desired mineral and gangue, wherein the process comprises carrying out a flotation process in the presence of one or more of the exemplary depressants, are also disclosed.

The disclosure may be understood more readily by reference to the following detailed description of the various features of the disclosure and the examples included therein.

DETAILED DESCRIPTION

According to the various exemplary embodiments described herein, depressants and related compositions and processes may be used to concentrate iron from iron ore. More generally, the exemplary depressants and related compositions and processes may be used to concentrate desired minerals from mineral-containing ore. Exemplary depressants comprise moderately oxidized polysaccharides, for example moderately oxidized starch. Generally, oxidized starch includes more anionic charged groups than starch which has not been oxidized. In exemplary embodiments, selectivity of the exemplary depressants is improved compared to starch which has not been oxidized or has been over-oxidized. In exemplary embodiments, the increased selectivity of the exemplary depressants can be used to enhance dispersion of heterogeneous mineral agglomerates during flotation processes, which allows the minerals to be more readily separated. In exemplary embodiments, the depressants are suitable for use in a process involving reverse cationic flotation of a mineral ore, such as iron ore. Further to the increased flotation process selectivity, the exemplary depressants can also be used to provide decreased collector consumption, decreased sodium hydroxide consumption and/or decreased landfill, especially as compared to starch-based depressants, for example starch-based depressants that do not substantially comprise moderately oxidized polysaccharides. In certain embodiments, the flotation concentration, or dosing, of the depressant is reduced compared to dosing of starch-based depressants. In exemplary embodiments, the depressants may be provided in a form which renders them easier to dilute and/or directly apply, for example in solution form. In exemplary embodiments, the exemplary depressants can be applied in the form of a solid or a solution.

DEFINITIONS

As used herein, "gangue" refers to the undesirable minerals in a material, for example an ore deposit, that contains both undesirable and desired minerals. Such undesirable minerals may include oxides of aluminum, silica (e.g. quartz), titanium, sulfur and alkaline earth metals. In certain embodiments, the gangue includes oxides of silica, silicates or siliceous materials.

As used herein, the terms "desired minerals" or "minerals of value" refer to minerals that have value, and in particular, may be extracted from ore that contains the desired mineral and gangue. Examples of desired minerals include iron powder, hematite, magnetite, pyrite, chromite, goethite, marcasite, limonite, pyrrhotite or any other iron-containing minerals. As used herein, "ore" refers to rocks and deposits from which the desired minerals can be extracted. Other sources of the desired minerals may be included in the definition of "ore" depending on the identity of the desired mineral. The ore may contain undesirable minerals or materials, also referred to herein as gangue.

As used herein, "iron ore" refers to rocks, minerals and other sources of iron from which metallic iron can be extracted. The ores are usually rich in iron oxides and vary in color from dark grey, bright yellow, deep purple, to rusty red. The iron itself is usually found in the form of magnetite ($Fe_3O_4$), hematite ($Fe_2O_3$), goethite (FeO(OH)), limonite (FeO(OH)•n($H_2O$)), siderite ($FeCO_3$) or pyrite ($FeS_2$). Taconite is an iron-bearing sedimentary rock in which the iron minerals are interlayered with quartz, chert, or carbonate. Itabirite, also known as banded-quartz hematite and hematite schist, is an iron and quartz formation in which the iron is present as thin layers of hematite, magnetite, or martite. Any of these types of iron are suitable for use in processes described herein. In exemplary embodiments, the iron ore is substantially magnetite, hematite, taconite or itabirite. In exemplary embodiments, the iron ore is substantially pyrite. In exemplary embodiments, the iron ore is contaminated with gangue materials, for example oxides of aluminum, silica or titanium. In exemplary embodiments, the iron ore is contaminated with clay, including for example kaolinite, muscovite, or other silicates.

As used herein, a "collector" refers to an agent that facilitates the flotation of the associated gangue in preference to the flotation of the desired minerals. Typically, collectors are reagents that are used to selectively adsorb onto the surfaces of particles. In some examples, the collector forms a monolayer on the particle surface that essentially makes a thin film of non-polar hydrophobic hydrocarbons. Collectors can be generally classed depending on their ionic charge: they can be nonionic, anionic, or cationic. The nonionic collectors are typically simple hydrocarbon oils. Typical anionic and cationic collectors consist of a polar part that selectively attaches to the mineral surfaces, and a non-polar part that projects out into the solution and makes the surface hydrophobic. For example, common cationic collectors include compounds featuring primary, secondary, and tertiary amine groups. Since the amine group has a positive charge, it can attach to negatively-charged particle surfaces. Collectors can either chemically bond to the mineral surface (chemisorption), or be held on the surface by physical forces (physical adsorption). Examples of collectors include carboxylic acids, sulfates, sulfonates, xanthates and dithiophosphates.

As used herein, a "pH adjuster" or "pH regulator" refers to an agent that is used to change or control pH. The surface chemistry of most minerals is affected by the pH. For example, in general, minerals typically develop a positive surface charge under acidic conditions and a negative charge under alkaline conditions. Since each mineral changes from negatively-charged to positively-charged at some particular pH, it is possible to manipulate the attraction of collectors to their surfaces by pH adjustment. Exemplary pH adjusters can be acids, for example sulfuric acid, or alkalis, for example lime (CaO or Ca(OH)$_2$) or ammonium hydroxide. Other useful pH adjusters are sodium-based alkalis such as NaOH or $Na_2CO_3$, wherein the sodium cation generally does not have any significant effect on the particle surface chemistries.

As used herein, a "depressant" is a chemical that inhibits the flotation of minerals to improve the selectivity of a flotation process. A depressant selectively coats mineral surfaces and reduces collector adsorption, or reduces the effectiveness of collectors that do adsorb.

Moderately Oxidized Polysaccharide

As used herein, the term "polysaccharide" refers to polymeric carbohydrate molecules composed of long chains of monosaccharide units bound together by glycosidic linkages. On hydrolysis, polysaccharides give their constituent monosaccharides or oligosaccharides. They range in structure from linear to highly branched. Generally, polysaccharides contain ten or more monosaccharide units. Given that the repeating units in the polymer backbone are often six-carbon monosaccharides, the general formula can be represented as $(C_6H_{10}O_5)_n$, where n is between about 10 and about 3000. Exemplary polysaccharides include but are not limited to: starch, glycogen, cellulose, hemicellulose, chitin, callose, laminarin, chrysolaminarin, xylan, arabinoxylan, mannan, fucoidan and galactomannan.

As used herein, the term "starch" refers to a carbohydrate consisting of a large number of monosaccharide (e.g. glucose) units joined by glycosidic bonds. It is well established that the starch polymer consists mainly of two fractions, amylose and amylopectin, which vary with the source of starch. The amylose, having a low molecular weight, contains one end group per 200-300 anhydroglucose units. Amylopectin is of higher molecular weight and consists of more than 5,000 anhydroglucose units with one end group for every 20-30 glucose units. While amylose is a linear polymer having α1→4 carbon linkage, amylopectin is a highly branched polymer with α1→4 and α1→6 carbon linkages at the branch points. Typically, starch comprises 10-30% amyloses (linear chains exclusively of alpha-1,4-glycosidically linked glucose molecules) and 70-90% amylopectin (highly branched chains having alpha-1,6-glycosidically and alpha-1,4-glycosidically linked glucose molecules). In exemplary embodiments, the starch is any suitable starch, for example corn starch, potato starch, wheat starch, pea starch, rice starch, tapioca starch, or a mixture thereof.

As used herein, "moderately oxidized polysaccharide" refers to a type of polysaccharide which has been partially or moderately oxidized, for example by treatment with one or more bases and one or more oxidizing agents in water to produce a desired amount of anionic charged groups, for example carboxylate groups. In exemplary embodiments, the treatment involves dissolving the polysaccharide in water or forming a solid slurry of the polysaccharide in water. In exemplary embodiments, the moderately oxidized polysaccharide can be a commercially available form of an oxidized polysaccharide, or polysaccharide that has been oxidized according to embodiments described herein. In exemplary embodiments, the one or more depressants comprise moderately oxidized polysaccharide. The anionic charge of oxidized polysaccharide varies, but is higher than non-oxidized polysaccharide.

As used herein, "moderately oxidized starch" refers to starch which has been partially or moderately oxidized, for example by treatment with one or more bases and one or more oxidizing agents in water to produce a desired amount of anionic charged groups, for example carboxylate groups. In exemplary embodiments, the treatment involves dissolving the starch in water or forming a solid slurry of the starch in water. In exemplary embodiments, the moderately oxidized starch can be a commercially available form of oxidized starch, or starch that has been oxidized according to embodiments described herein. In exemplary embodiments, the one or more depressants comprise moderately oxidized starch. The anionic charge of oxidized starch varies, but is higher than that of non-oxidized starch.

In exemplary embodiments, the moderately oxidized polysaccharide has about 0.05 to about 4.5 mmol, or about 0.06 to about 0.11 mmol, of anionic charge per gram at a pH of about 6 to about 7. In exemplary embodiments, the moderately oxidized polysaccharide has about 0.05 to about 5 mmol, about 0.1 to about 1 mmol, or about 0.7 to about 1.1 mmol, of anionic charge per gram at a pH of about 7 to about 8. In exemplary embodiments, the moderately oxidized polysaccharide has about 0.2 to about 5 mmol, or about 0.23 to about 0.36 mmol, of anionic charge per gram at a pH of about 10 to about 11.2. In exemplary embodiments, the moderately oxidized polysaccharide has about 0.2 to about 5 mmol, about 0.4 to about 5 mmol, about 0.21 to about 0.40 mmol, about 0.30 to about 0.40 mmol, about 1.0 to about 1.6 mmol, or about 0.30 to about 1.0 mmol, of anionic charge per gram at a pH of about 10.5.

In exemplary embodiments, the moderately oxidized starch has about 0.05-4.5 mmol, or about 0.06 to about 0.11 mmol, of anionic charge per gram at a pH of about 6 to about 7. In exemplary embodiments, the moderately oxidized starch has about 0.2 to about 5 mmol, or about 0.23 to about 0.36 mmol, of anionic charge per gram at a pH of about 10 to about 11.2. In exemplary embodiments, the pH and anionic charge of the moderately oxidized starch can be assessed, for example, by charge titration. Charge titration can be carried out by any suitable method known to those of ordinary skill in the art. In certain embodiments, the charge titration is carried out by the following method: (a) moderately oxidized starch is dissolved or diluted with deionized water or aqueous sodium hydroxide to produce a 0.02% solution (concentration by weight); (b) a portion (for example, about 15 g) of the solution is titrated until an endpoint of neutral charge is reached; and (c) the amount of titrant and final pH of the solution are recorded and the anionic charge calculated. In certain embodiments, instrumentation such as a Mutek PCD 03 unit fitted with an automatic titration feed of standard DADMAC (0.001 N cationic charge) is used for the titration.

In exemplary embodiments, the moderately oxidized starch is a moderately oxidized form of corn starch, potato starch, wheat starch, pea starch, rice starch, tapioca starch, or a mixture thereof.

In exemplary embodiments, the moderately oxidized polysaccharide, moderately oxidized starch, comprises about 0.2 to about 20% carboxylate groups by weight.

In exemplary embodiments, over-oxidation of the polysaccharide, or starch, can have detrimental effects on the depressant activity. The over-oxidation of the polysaccharide can lead to less anionic charge than the range observed for the moderately oxidized polysaccharide. In exemplary embodiments, the polysaccharide-oxidizing treatment comprises heating a mixture of polysaccharide, one or more bases and one or more oxidizing agents in water. In exemplary embodiments, an exemplary depressant comprising a moderately oxidized polysaccharide is provided, the depressant prepared by heating a mixture of polysaccharide, one or more bases and one or more oxidizing agents in water. In certain embodiments, the polysaccharide used in the treatment is starch or a mixture comprising starch.

In exemplary embodiments, the treatment, or moderate oxidation of the polysaccharide, comprises heating a mixture of polysaccharide, sodium hydroxide, and hydrogen peroxide in water. In exemplary embodiments, the polysaccharide used in the treatment is in the form of an aqueous solution or a dry powder. In exemplary embodiments, the heating step is carried out at any suitable temperature, for example a temperature in the range of about 20° C. to about 100° C., about 50° C. to about 100° C., or about 55° C. to about 75° C. In exemplary embodiments, the heating step is carried out for any suitable amount of time, for example about 15 minutes to about 6 hours, about 2 hours to about 6 hours, or about 3 to about 5 hours. In certain embodiments, the heating step is carried out at a temperature of about 55° C. for about 4 hours. In exemplary embodiments, the treatment further comprises stirring the polysaccharide, one or more bases and one or more oxidizing agents in water. In exemplary embodiments, the amount of water used in the treatment is any suitable amount of water, for example the amount of water necessary to prepare a polysaccharide solution with a concentration of about 0.5% to the point of saturation, about 0.5% to about 50% by weight, about 0.5% to about 20% by weight, or about 0.5% to about 2% by weight. In exemplary embodiments, the amount of water used in the treatment may be adjusted or minimal, so as to produce a high concentration of dissolved polysaccharide or to produce a polysaccharide slurry. In certain embodiments, the polysaccharide used in the oxidation treatment is not fully dissolved in the water at the start of the treatment.

In exemplary embodiments, the treatment, or moderate oxidation of the starch, comprises heating a mixture of starch, sodium hydroxide, and hydrogen peroxide in water. In exemplary embodiments, the starch used in the treatment is in the form of an aqueous solution or a dry powder. In exemplary embodiments, the heating step is carried out at any suitable temperature, for example a temperature in the range of about 20° C. to about 100° C., about 50° C. to about 100° C., or about 55° C. to about 75° C. In exemplary embodiments, the heating step is carried out for any suitable amount of time, for example about 15 minutes to about 6 hours, about 2 hours to about 6 hours, or about 3 to about 5 hours. In certain embodiments, the heating step is carried out at a temperature of about 55° C. for about 4 hours. In exemplary embodiments, the treatment further comprises stirring the starch, one or more bases and one or more oxidizing agents in water. In exemplary embodiments, the amount of water used in the treatment is any suitable amount of water, for example the amount of water necessary to prepare a corn starch solution with a concentration of about 0.5% to the point of saturation, about 0.5% to about 50% by weight, about 0.5% to about 20% by weight, or about 0.5% to about 2% by weight. In exemplary embodiments, the amount of water used in the treatment may be adjusted or minimal, so as to produce a high concentration of dissolved starch or to produce a starch slurry. In certain embodiments, the starch used in the oxidation treatment is not fully dissolved in the water at the start of the treatment.

In exemplary embodiments, the starch is cornstarch, for example pearl cornstarch.

In exemplary embodiments, the one or more bases can be any suitable base. In exemplary embodiments, the one or more bases are selected from sodium hydroxide, potassium hydroxide and the like. In exemplary embodiments, the one or more oxidizing agents are selected from hydrogen peroxide, sodium peroxide, ozone, oxygen, bleach, sodium hypochlorite, sodium percarbonate, sodium perborate, sodium nitrate, and the like.

In exemplary embodiments, the ratio of the weight of the polysaccharide in grams to the moles of the one or more bases is in the range of about 400:1 to about 4:1, 320:1 to about 4:1, 316:1 to about 48:1, or about 316:1. In exemplary embodiments, the ratio of the weight of the polysaccharide in grams to the moles of sodium hydroxide is in the range of about 400:1 to about 4:1, 320:1 to about 4:1, 316:1 to about 48:1, or about 316:1. In exemplary embodiments, the minimum amount of base to be used in the treatment is the amount of base necessary to form at least a ratio of 400:1 for the weight of the polysaccharide in grams to the moles of the one or more bases.

In exemplary embodiments, the ratio of the weight of the polysaccharide in grams to the moles of one or more oxidizing agents is in the range of about 1020:1 to about 0:1, 850:1 to about 10.2:1, 760:1 to about 112:1, or about 760:1 to about 10.2:1. In exemplary embodiments, the ratio of the weight of the polysaccharide in grams to the moles of the hydrogen peroxide is in the range of about 1020:1 to about 0:1, 850:1 to about 10.2:1, 760:1 to about 112:1, or about 760:1 to about 10.2:1.

In a particular embodiment, the heating step is carried out for about 30 minutes to about 5 hours, or about 3 hours to about 5 hours, at a temperature in the range of about 55° C. to about 95° C., or about 55° C. to about 75° C. the amount of water used in the treatment is the amount of water necessary to prepare a polysaccharide solution with a concentration of about 0.5% to about 10%, or about 0.5% to about 2%, by weight, the one or more bases comprises sodium hydroxide, and the one or more oxidizing agents comprises hydrogen peroxide.

In a particular embodiment, the starch is cornstarch, the heating step is carried out for about 30 minutes to about 5 hours, or about 3 hours to about 5 hours, at a temperature in the range of about 55° C. to about 95° C., or about 55° C. to about 75° C. the amount of water used in the treatment is the amount of water necessary to prepare a corn starch solution with a concentration of about 0.5% to about 10%, or about 0.5% to about 2%, by weight, the one or more bases comprises sodium hydroxide, and the one or more oxidizing agents comprises hydrogen peroxide.

According to the embodiments, the exemplary depressants may have any molecular weight so long as the depressants have the effect of selectively depressing the desired minerals in preference to the associated gangue. In exemplary embodiments, the molecular weight of the exemplary depressant is about 0.01 Mg/mol to about 1 Mg/mol, about 0.1 Mg/mol to about 1 Mg/mol, about 0.01 Mg/mol to about 6.6 Mg/mol, about 0.1 Mg/mol to about 6.6 Mg/mol, about 0.46 Mg/mol to about 6.6 Mg/mol, or about 1.06 Mg/mol to about 6.16 Mg/mol.

The exemplary depressants are generally useful as depressants in a reverse phase flotation process, for example a reverse cationic flotation process. In particular, the exemplary depressants are effective in selectively depressing the flotation of desired mineral(s) as compared to gangue. In certain embodiments, the exemplary depressants are used to enhance the separation of iron-containing minerals, such as iron oxides or iron powder, from silicate gangue by differentially depressing the flotation of the iron-containing minerals relative to that of the silicate gangue. One of the problems associated with the separation of iron-containing minerals from silicate gangue is that the iron-containing minerals and silicates both tend to float under certain processing conditions.

The exemplary depressants change the flotation characteristics of the iron-containing minerals relative to silicate gangue, to improve the separation process.

Compositions

In exemplary embodiments, a composition comprises one or more depressants comprising moderately oxidized polysaccharide as described herein, and a solvent. In exemplary embodiments, the solvent is water. In exemplary embodiments, the composition is a solution, for example an aqueous solution.

An exemplary composition may be formulated to provide a sufficient amount of the one or more depressants to a flotation process, i.e., an amount sufficient to produce a desired result.

In an exemplary embodiment, the composition may further comprise one or more agents or modifiers known in the froth flotation art. Examples of such agents or modifiers include, but are not limited to, frothers, activators, collectors, dispersants, other depressants, acidic or basic addition agents, or any other agent known in the art, provided that the depressant retains its desired functionality, as described herein.

In exemplary embodiments, the composition may include one or more additional depressants in addition to the one or more exemplary depressants. Examples of additional depressants that may be used in combination with the exemplary depressants include but are not limited to: starch; hemicellulose; cellulose esters, such as carboxymethylcellulose and sulphomethylcellulose; cellulose ethers, such as methyl cellulose, hydroxyethylcellulose and ethyl hydroxyethylcellulose; hydrophilic gums, such as gum arabic, gum karaya, gum tragacanth and gum ghatti, alginates; starch derivatives, such as carboxymethyl starch and phosphate starch; other polysaccharide-based or modified polysaccharide depressants; and combinations thereof In exemplary embodiments, the composition may include one or more collectors or collecting agents, provided that the depressant retains its desired functionality, as described herein.

Processes

According to exemplary embodiments, a flotation process may use one or more of any of the exemplary depressants described herein. In exemplary embodiments, the flotation process may include any known or later developed flotation techniques for separating or concentrating desirable minerals from ore, for example, iron from taconite. In exemplary embodiments, the flotation process is a reverse cationic flotation of iron ore.

In an exemplary flotation process, a slurry (flotation pulp) comprising desired mineral particles, gangue, and water is aerated, such as in a tank or column called a flotation cell. The air bubbles attach to certain particles, carrying them to the surface of the slurry, and forming a froth, which may be removed. Generally, the resulting froth contains primarily those materials which are hydrophobic, are wetted and have an affinity for air bubbles. The particles in the slurry that remain completely wetted stay in the solid/liquid phase.

Exemplary flotation processes take advantage of the differences in hydrophobicity between the desired minerals and the gangue to achieve separation of these materials. In exemplary embodiments, one or more exemplary depressants is added to the flotation system to selectively interact with the surface of the desired mineral particles, resulting in a reduced surface hydrophobicity that improves the depression of the desired mineral particles (i.e., reduces their propensity to float) in the flotation process. In exemplary embodiments, one or more exemplary depressants are added to the flotation system to selectively interact with the surface of the gangue particles, resulting in a reduced surface hydrophobicity that improves the depression of the gangue particles in the flotation process.

In exemplary embodiments, the flotation process may be a part of a mineral extraction process. For example, the mineral extraction process may include the steps of grinding crushed ore, classifying the ground ore in water, and treating the classified ore by froth flotation to concentrate the desired minerals. Some of these steps are described in more detail below.

In exemplary embodiments, the flotation process comprises floating the gangue in the froth and recovering the desirable mineral concentrate from the bottom of the cell as the underflow. In other exemplary embodiments, the flotation process comprises inducing the gangue to sink to the bottom of the cell (as underflow) and recovering the desirable mineral concentrate as the overflow (froth). In exemplary embodiments, the flotation process comprises separating iron concentrates from silica and other silaceous materials (gangue) by flotation of the gangue and recovering the iron concentrate as underflow.

In exemplary embodiments, a process for enriching a desired mineral from an ore having the desired mineral and gangue includes carrying out a flotation process in the presence of one or more collecting agents and one or more depressants.

In exemplary embodiments, the desired mineral is an iron-containing mineral, such as iron oxides or iron powder.

In exemplary embodiments, a process for enriching an iron-containing mineral from an ore having the iron-containing material and silicate-containing gangue, includes carrying out a flotation process in the presence of one or more collecting agents and one or more exemplary depressants described herein.

In exemplary embodiments, the flotation process is a reverse or inverted flotation process, for example a reverse cationic flotation process. In such processes, the flotation of the desired mineral is selectively depressed when compared to the flotation of the gangue so as to facilitate separation and recovery of the desired mineral.

In exemplary embodiments, the flotation process is a direct flotation process, for example a cationic or anionic flotation process.

In exemplary embodiments, the flotation process is not an anionic flotation process.

In certain exemplary embodiments, the one or more depressants are added in the form of a composition comprising the depressant and a solvent.

In exemplary embodiments, the one or more depressants may be added at any stage of the process prior to the flotation step. In exemplary embodiments, the one or more depressants may be added during the flotation step.

According to various exemplary embodiments, the amount of depressant to be used in the flotation process is that amount which will depress the flotation of the desired mineral ore or ores to a necessary or desired extent. The amount of depressant added will depend, at least in part, on a number of factors such as the particular ore to be processed, desired mineral and gangue to be separated, the composition of the one or more depressants, the particle size of the gangue and desired mineral, and other conditions of the flotation process. In exemplary embodiments, the amount of depressant used in the flotation process is about 0.01 to about 3 kg, about 0.1 to about 2 kg, or about 0.2 to about 1 kg of depressant per metric ton of ore treated in the reverse flotation process. In exemplary embodiments, the specific consumption of depressant in the process is about 0.01 to about 3 kg, about 0.1 to about 2 kg, or about 0.2 to about 1 kg of depressant per metric ton of ore to be treated.

According to various embodiments, the amount of depression may be quantified. For example, a percent depression is calculated by measuring the weight percent of the particular mineral or gangue floated in the absence of any depressant and measuring the weight percent of the same mineral or gangue floated in the presence of a depressant. The latter value is subtracted from the former; the difference is divided by the weight percent floated without any depressant; and this value is multiplied by 100 to obtain the percent of depression. In exemplary embodiments, the percent of depression may be any amount that will provide a necessary or desired amount of separation of the desirable minerals from gangue. In exemplary embodiments, use of the exemplary depressant causes the flotation of desirable minerals to be depressed by at least about 1%, about 7%, about 30%, about 44%, about 50% or about 57%. In exemplary embodiments, use of the exemplary depressant causes the flotation of desirable minerals to be depressed by in the range of about 1% to about 60%, about 7% to about 58%, or about 30% to about 58%. In exemplary embodiments, use of the depressant causes the flotation of the gangue to be depressed by less than about 40% or about 6%.

According to alternative embodiments, the amount of depression may be quantified according to the percent improvement of the mineral grade, i.e., the change in percent by weight of the valuable mineral in the concentrated material compared to the material before the froth flotation process. In exemplary embodiments, use of the disclosed depressant causes valuable metal grade to increase by at least about 0.1%, about 1.0%, about 1.5%, about 2.0%, about 3.0%, about 11.8%, or about 13% compared to the same process run without the depressant. In exemplary embodiments, use of the disclosed depressant causes valuable metal grade to increase by an amount in the range of about 0.1% to about 15%, about 1.0% to about 13%, or about 1.3% to about 13% compared to the same process run without the depressant. Even relatively modest amounts of improvement to the recovered metal grade may represent significant increases in production and profitability of the method over time.

In an exemplary process, one or more additional agents and/or modifiers may be added to the ore that is dispersed in water (flotation pulp). Examples of such agents and modifiers include but are not limited to frothers, activators, collecting agents, dispersants, depressants, acidic or basic addition agents, or any other agent known in the art.

According to the exemplary embodiments, the flotation process can use one or more exemplary moderately oxidized polysaccharide depressants in combination with one or more additional depressants. Examples of additional depressants include: starch; hemicellulose; cellulose esters, such as carboxymethylcellulose and sulphomethylcellulose; cellulose ethers, such as methyl cellulose, hydroxyethylcellulose and ethyl hydroxyethylcellulose; hydrophilic gums, such as gum arabic, gum karaya, gum tragacanth and gum ghatti, alginates; starch derivatives, such as carboxymethyl starch and phosphate starch; and combinations thereof.

According to the exemplary embodiments, the flotation process uses the depressants in combination with one or more collectors or collecting agents. In certain embodiments, the one or more depressants are added before or with the addition of collecting agents. In certain embodiments, in one step of the flotation process, one or more collecting agents may be added, for example after the addition of the one or more depressants and any other process agents. In exemplary embodiments, a collecting agent or collector may be added to the flotation pulp. Generally, collecting agents may form a hydrophobic layer on a given particle surface in the flotation pulp, which facilitates attachment of the hydrophobic particles to air bubbles and recovery of such particles in the froth product. Any collecting agent may be used in the exemplary processes. The choice of collector will depend, at least in part, on the particular ore to be processed and on the type of gangue to be removed. Suitable collecting agents will be known to those skilled in the art. In exemplary embodiments, the collector is a cationic collector that is an organic molecule having a positive charge when in an aqueous environment. In certain embodiments, the cationic collectors have a nitrogen group with unpaired electrons present. Cationic collectors which may be used in combination with exemplary depressants are not particularly limited and include: fatty amines, ether amines, amine condensates, alkyloxyalkaneamines, alkoxylated quaternary ammonium compounds and their salts. The fatty amines may be mono-functional or difunctional and the amine functionality may be primary, secondary or tertiary. Similarly, the ether amines may be primary amines or may be difunctional. Ether amines for use as collectors according to the presently disclosed embodiments are not particularly limited and include $C_{5-15}$ aryl or alkyl oxypropyl amines which may be branched or linear, and $C_{5-15}$ branched or linear oxypropyl diaminopropane.

In exemplary embodiments, the collecting agents may be compounds comprising anionic groups, cationic groups or non-ionic groups. In certain embodiments, the collecting agents are surfactants, i.e. substances containing hydrophilic and hydrophobic groups linked together. Certain characteristics of the collecting agent may be selected to provide a selectivity and performance, including solubility, critical micelle concentration and length of carbonic chain.

Exemplary collecting agents include compounds containing oxygen and nitrogen, for example, compounds with amine groups. In exemplary embodiments, the collecting agents may be selected from the group consisting of: ether amines, for example primary ether monoamines, and primary ether polyamine; aliphatic $C_8$-$C_{20}$ amines for example aliphatic amines derived from various petroleum, animal and vegetable oils, octyl amine, decyl amine, dodecyl amine, tetradecyl amine, hexadecyl amine, octadecyl amine, octadecenyl amine and octadecadienyl amine; quaternary amines for example dodecyl trimethyl ammonium chloride, coco trimethyl ammonium chloride, and tallow trimethyl ammonium sulfate; diamines or mixed amines for example tallow amine, hydrogenated tallow amine, coconut oil or cocoamine, soybean oil or soya-amine, tall oil amine, rosin amine, tallow diamine, coco diamine, soya diamine or tall oil diamines and the like, and quaternary ammonium compounds derived from these amines; amido amines and imidazolines such as those derived from the reaction of an amine and a fatty acid; and combinations or mixtures thereof. In an exemplary embodiment, the collecting agent is an ether amine or mixture of ether amines. In exemplary embodiments, the collecting agent is a synthetic ether diamine, for example Tomamine DA-16 (available from Air Products).

Exemplary collecting agents may be partially or wholly neutralized by a mineral or organic acid such as hydrochloric acid or acetic acid. Such neutralization facilitates dispersibility in water. In the alternative, the amine may be used as a free base amine by dissolving it in a larger volume of a suitable organic solvent such as kerosene, pine oil, alcohol, and the like before use. These solvents sometimes have undesirable effects in flotation such as reducing flotation selectivity or producing uncontrollable frothing. Although these collecting agents differ in structure, they are similar in that they ionize in solution to give a positively charged organic ion.

According to the exemplary embodiments, the quantity of collecting agent used in the flotation process may vary. For example, the amount of collecting agent may depend, at least in part, upon the gangue content of the ore being processed. For example, when processing ores having higher silica, one may utilize a relatively greater quantity of collecting agents. In exemplary embodiments, about 0.01 to about 2 lbs., or about 0.1 to about 0.35 lbs., of collecting agent per ton of ore may be added to the flotation process.

In exemplary embodiments, one type of collecting agent is used in the process. In exemplary embodiments, two or more collecting agents are used in the process.

In exemplary embodiments, one or more frothing agents are used in the process. Exemplary frothing agents are heteropolar organic compounds which reduce surface tension by being absorbed at air-water interfaces and thus facilitate formation of bubbles and froth. Examples of frothing agents include: methylisobutyl carbinol; alcohols having 6-12 carbon atoms which optionally are alkoxylated with ethylene oxide and/or propylene oxide; pine oil; cresylic acid; various alcohols and soaps. In exemplary embodiments, about 0.001 to 0.2 lb. of frothing agent per ton of ore are provided.

According to an exemplary embodiment, the flotation process results in a gangue-enriched floate (froth) and a bottom fraction rich in the desired mineral (tailings, underflow). In exemplary embodiments the flotate or froth contains silicate. In exemplary embodiments, the bottom fraction contains iron.

According to the embodiments, the flotation process may include one or more steps prior to the flotation step to prepare the ore for flotation. For example, an exemplary process may include the step of grinding the ore, together with water, to a desired particle size, for example a particle size between about 5 and about 200 μm. Optionally, one or more conditioning agents such as sodium hydroxide and/or sodium silicate may be added to the grinding mill prior to grinding the crude ore. In exemplary embodiments, sufficient water is added to the grinding mill to provide a slurry containing approximately 70% solids.

In exemplary processes, the ground ore may be deslimed. For example, the ground ore may be suspended in water, and fine material may be deslimed, by filtration, settling, siphoning, hydrocyclone or centrifuging. In exemplary embodiments, the desliming step may be repeated one or more times.

In exemplary processes, an ore-water slurry may be prepared from the ground ore or the deslimed ore, and one or more depressants according to the embodiments may be added to the slurry. In exemplary embodiments, the one or more depressants are added in an amount of about 10 g to about 2500 g, about 10 g to about 2000 g, about 10 g to about 1500 g, or about 10 g to about 1000 g per ton of ore. In exemplary embodiments, the ore-water slurry may be transferred to a flotation cell and the one or more depressants are added to the ore water slurry in the flotation cell.

In exemplary embodiments, a base or alkali pH adjuster may be added to the slurry to adjust the pH of the slurry. For example, a pH adjuster may be added to the slurry to produce a pH in the range of about 7 to about 11, about 8 to about 11, or about 9 to about 11, about 10 to about 11, about 7 to about 8, or about 7.5 to about 8.5. In certain embodiments, the pH is adjusted to about 10.5. In certain embodiments, the pH is adjusted to about 7 to about 8. In exemplary embodiments, the pH of the slurry in the flotation cell is maintained at between about 7.5 and about 11 for optimum iron recoveries.

In exemplary embodiments, the flotation process may include a step involving conditioning or agitation of the slurry. For example, once all of the processing agents have been added to the slurry, the mixture is further conditioned or agitated for a period of time before the froth flotation is carried out.

In exemplary embodiments, the flotation process may be performed in a plurality of flotation processing steps. For example, the flotation process may be performed in flotation units containing a plurality of communicating cells in series, with the first cell(s) being generally used for the rougher flotation, and subsequent cell(s) being used for the cleaner flotation. In exemplary embodiments, each flotation cell may be any flotation equipment, including, for example, the Denver laboratory flotation machine and/or the Wemco Fagergren laboratory flotation machine, in which the slurry mixture is agitated and air is injected near the bottom of the cell as desired.

In exemplary embodiments, before flotation treatment, the ore-water slurry comprises about 20 to about 40% by weight solids. In exemplary embodiments, the duration of the flotation process depends upon the desired result. In exemplary embodiments, the time of flotation treatment may be from about 1 to about 10, or about 3 to about 7 minutes for each circuit. The time of the flotation process may depend at least in part upon the gangue content, the grain size of the ore being treated and the number of flotation cells involved.

According to the embodiments, the flotation process includes a rougher flotation treatment, in which the gangue may be selectively separated from the ore and removed with the flotation froth. The desired mineral concentrate from the flotation treatment is removed as the underflow and isolated as the rougher concentrate. In exemplary embodiments, the concentrate of the desirable mineral in the rougher concentrate is found to contain a sufficiently low quantity of gangue to be suitable for almost any desired use.

In exemplary embodiments, the flotation froth, the rougher concentrate, or both may be further processed. For example, in exemplary embodiments, the overflow or froth from the rougher flotation may be advanced to a first cleaner flotation cell where a second flotation treatment is performed. The underflow from this first cleaning flotation cell is a mineral concentrate identified as the first cleaner middlings which generally will contain more gangue than the rougher concentrate but significantly less gangue than the original crude ore. The overflow frothing from the first cleaning cell may be advanced to a second cleaning flotation cell where the flotation procedure is repeated and another mineral concentrate is obtained which is identified as the second cleaner middlings. In exemplary embodiments, the froth flotation cleaning is repeated one or more times. Any or all of the cleaner middlings may be combined with a rougher concentrate to provide an upgraded mineral ore concentrate. The extent to which the rougher concentrate is combined with the various middling fractions will depend upon the desired mineral content of the final product derived from the procedure. As an alternative embodiment, the cleaner middlings may be returned and recycled through the rougher flotation cell to further upgrade these cleaner middlings.

The depressants, compositions and processes of the exemplary embodiments can be used to provide higher selectivity and desired mineral recoveries as compared to other depressants when used in cationic flotation processes. In exemplary embodiments, the mineral concentrate, e.g. hematite concentrate, that is obtained by the exemplary processes meets the specifications for the steel industry. In exemplary embodiments, the depressants, compositions and processes can be used to maximize the iron recovery to increase production of metallic charge per unit ore fed, which may provide increases in production and profitability.

In exemplary embodiments, the depressants, compositions and processes described herein can be used to improve the grade of iron from iron ore such that the grade of the recovered iron is at least about 59%, about 60%, about 61%, or about 62%. In exemplary embodiments, the depressants, compositions and processes described herein can be used to improve the grade of iron from iron ore such that the grade of the recovered iron is in the range of about 58% to about 65%, about 59% to about 65%, about 60% to about 65%, or about 61% to about 65%.

In exemplary embodiments, the depressants, compositions and processes described herein can be used to improve the grade of iron from iron ore by at least about 0.5%, about 1%, about 1.2%, about 1.25%, about 1.3%, about 1.5%, about 2%, about 2.5%, about 3%, about 3.5%, about 4%, about 4.5%, about 5%, about 5.5%, about 6%, about 7%, about 8%, about 9%, about 10%, about 11%, or about 12%. In exemplary embodiments, the depressants, compositions and processes described herein can be used to improve the grade of iron from iron ore by an amount in the range of about 0.5% to about 13%, or about 1.3% to about 13%. For example, the depressants, compositions and processes described herein can be used to improve the grade of iron from iron ore with an initial iron grade of about 58% to about 59%, to a grade of at least about 59.5%, about 60%, about 60.5%, about 61%, about 61.5%, or about 62%. In exemplary embodiments, the depressants, compositions and processes described herein can be used to improve the grade of iron from iron ore by about 0.5% to about 7%, about 1% to about 7%, about 1.5% to about 6%, or about 1.0% to about 1.5%.

In exemplary embodiments, the depressants, compositions and processes described herein can be used to improve the grade of iron oxide from iron ore such that the grade of the recovered iron oxide is at least about 80%, about 81%, about 82%, about 83%, about 84%, about 85%, about 86%, about 87%, or about 88%. In exemplary embodiments, the depressants, compositions and processes described herein can be used to improve the grade of iron oxide from iron ore such that the grade of the recovered iron oxide is in the range of about 80% to about 90%, about 82% to about 90%, about 82% to about 88%, or about 86% to about 88%.

In exemplary embodiments, the depressants, compositions and processes described herein can be used to improve the recovery of iron from iron ore to at least about 70%, about 75%, about 77%, about 80%, about 85%, about 90%, or about 95%. In exemplary embodiments, the depressants, compositions and processes described herein can be used to improve the recovery of iron from iron ore such that the recovery of iron is in the range of about 70% to about 96%, or about 77% to about 96%.

In exemplary embodiments, the depressants, compositions and processes can be used to reduce the amount of silica in the iron ore to less than about 15%, about 10%, about 9%, about 8%, about 7%, about 6%, about 5%, about 4%, about 3%, or about 2%.

The following examples are presented for illustrative purposes only, and are not intended to be limiting.

EXAMPLES

Example 1

Flotation Test with Iron Ore and Exemplary Depressant Comprising Moderately Oxidized Starch In this example, flotation tests were conducted on a laboratory scale with the objective of separating the mineral of interest (hematite) from gangue. The general protocol for flotation tests as described above was used for these experiments. The depressants used for these experiments and their preparation are described below.

Preparation of the Depressant Samples

Moderately oxidized starch was produced with 0.36 mmol of anionic charge per gram (measured at pH 11.2). The overly-oxidized starch had an anionic charge of 0.04 mmol per gram (measured at pH 10.7).

In this example, flotation tests were conducted to assess separation of iron from gangue. Samples of iron ore slurries were obtained in 5-gallon buckets at neutral pH 7-8 with 38 ppm Ca. Percent solids were determined. Process water was added to adjust solids to 40% by weight. 1 L ore slurry samples were used for each flotation experiment, containing about 570 g of solid. Tomamine DA-16 (a synthetic ether diamine collector) and methyl isobutyl carbinol (MIBC, a frother) were diluted with deionized water to 1% aqueous solutions prior to use. Pearl cornstarch was obtained from Sigma-Aldrich (3.6 MMw GPC analysis).

The exemplary depressant comprising moderately oxidized starch was prepared as follows:

A 1% corn starch solution was prepared by adding NaOH (50%, 8.5 g) to a starch (5.0 g) slurry in water (deionized water, 483.6 g), with stirring, in a 1 L Erlenmeyer flask. Hydrogen peroxide (50%, 3.0 g) was then added and the solution was covered with a watch glass and heated at 65° C. for 4 h with stirring. Some foaming was observed. A clear, light yellow solution was obtained (488 g due to evaporation loss, pH=13.5-14). The starch:NaOH weight ratio was 1.18:1.

The comparative depressant comprising heavily oxidized starch was prepared as follows:

A 1% corn starch solution was prepared by adding NaOH (50%, 85 g) to a starch (5.0 g) slurry in water (deionized water, 380 g), with stirring, in a 1 L beaker. Hydrogen peroxide (50%, 30 g) was then added slowly and the solution was covered with a watch glass and heated at 65° C. for 4 h with stirring. Significant foaming occurred. A clear, light yellow-brown solution was obtained (326.8 g due to evaporation loss, pH=14). The starch:NaOH weight ratio was 0.118:1.

The comparative depressant comprising unmodified starch was treated as follows:

NaOH (1M, 15 mL) was added to a corn starch (3.0 g) slurry in water (DI, 10 g) with stirring for 10 min. Solution mass was brought to 300 g by DI water addition with stirring for 1 h. The starch:NaOH weight ratio was 5:1.

The blank depressant sample used in the flotation experiments consisted of deionized water.

Flotation Tests

The flotation tests were performed in a 1 L Metso laboratory flotation cell with continuous agitation at 800 rpm. For the flotation tests, the depressant was added and pH was adjusted with 25% NaOH, then allowed to condition for 5 minutes. The collector and frother were added simultaneously upon initiation of air flow without allowing conditioning time for the collector. Four froth (tail) fractions were collected, switching collection pans at 30 seconds, 1 minute, and 2 minutes. Air flow was stopped at 3 minutes. The four tailing samples and concentrate sample were dried, weighed, collected and analyzed for Fe and Si by XRF. Initial feed concentrations were calculated based on the sum of all tail and concentrate analyses. For the flotation tests, the depressant (dosage of 2000 g per ton ore solids, i.e. 114 g depressant solution or 1.14 g dry depressant for 570 g dry ore equivalent, or deionized water for blank) was added and allowed to condition for 5 minutes. The pH was not adjusted and was about 7.5-8.5. The collector (Tomamine DA-16, a synthetic ether diamine collector, dosage 220 g per ton ore solids) and frother (methyl isobutyl carbinol, dosage 50 g per ton ore solids) were added simultaneously upon initiation of air flow. Four froth (tail) fractions were collected from times 0 to 30 s; 30 to 60 s; 60 to 120 s; and 120 to 180 s. Air flow was stopped after 180 s. The four tailing samples and concentrate sample were dried, weighed, collected and analyzed for Fe and Si by X-ray fluorescence (XRF). Initial feed concentrations were calculated based on the sum of all tail and concentrate analyses.

Figure 1:
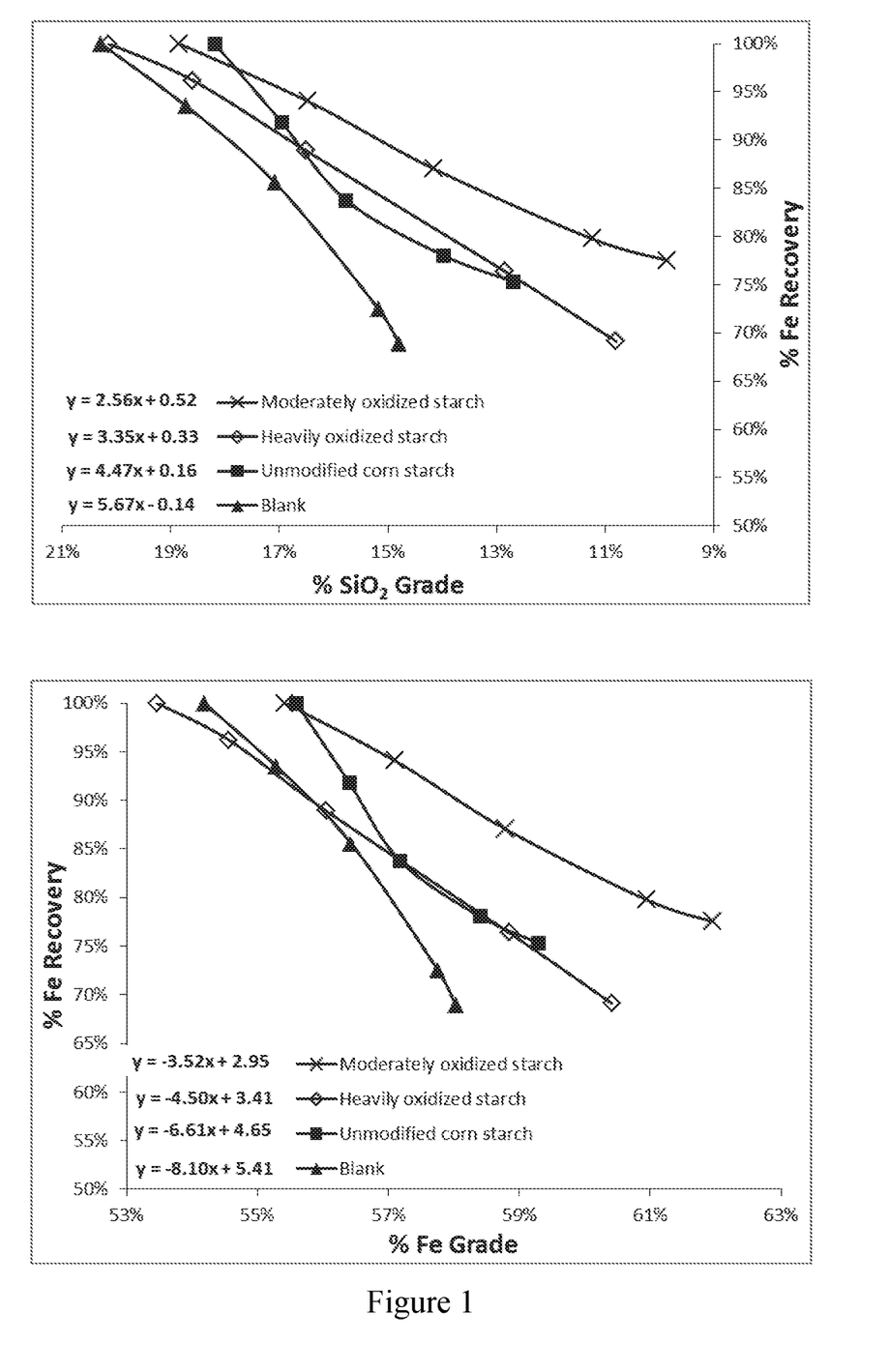
FIG. 1 shows a plot of the resulting $SiO_2$ grade (%) versus the Fe recovery (%) from flotation of iron ore treated with a blank, starch, an exemplary depressant comprising moderately oxidized starch or heavily oxidized starch (top graph), as well as a plot of the resulting Fe grade (%) versus the Fe recovery (%) from the same experiments (bottom graph).
Figure 2:
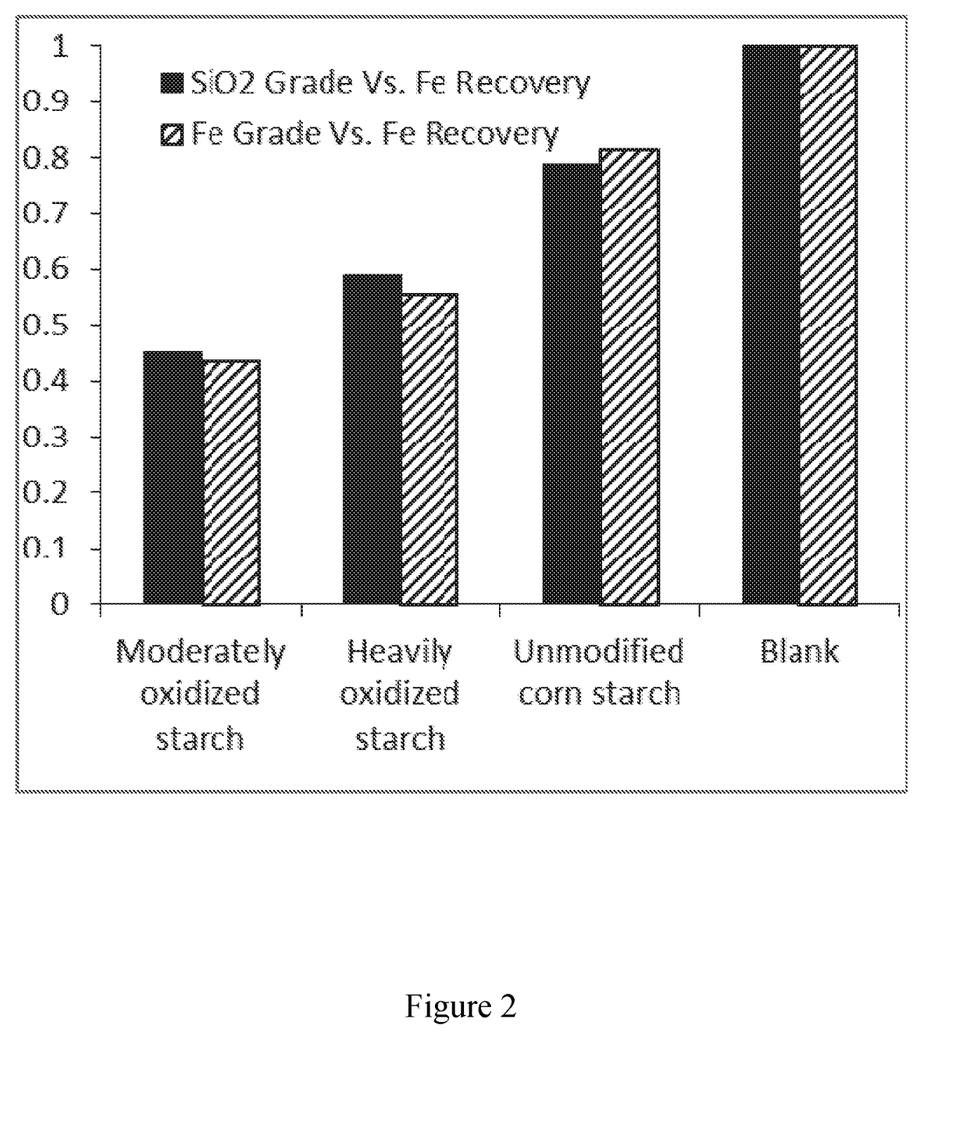
FIG. 2 is a bar graph depicting the relative slopes of $SiO_2$ grade (%) versus the Fe recovery (%), Fe grade (%) versus the Fe recovery (%), and $SiO_2$ floated (%) versus the Fe recovery (%) from flotation of iron ore treated with a blank, starch, an exemplary depressant comprising moderately oxidized starch or heavily oxidized starch.

The XRF data was used to calculate and plot $SiO_2$ grade versus Fe recovery and Fe grade versus Fe recovery (shown in FIG. 1). The relative slopes are presented in FIG. 2. Performance is affected by the degree of starch oxidation as seen in FIG. 2. Oxidizing starch can result in an improved performance, but too much oxidation can be detrimental.

It was observed that the moderately oxidized starch, when used in the flotation tests, improved the iron grade more than the heavily oxidized starch, unmodified starch and blank. Use of the moderately oxidized starch in the flotation tests also produced a high percentage of iron recovery (greater than 77%).

Example 2

Flotation Test with Iron Ore and Exemplary Depressants Comprising Moderately Oxidized Starch In this example, flotation tests were conducted to assess separation of iron from gangue. Samples of iron ore slurries were obtained in 5-gallon buckets at neutral pH 7-8 with 38 ppm Ca. Percent solids were determined. Process water was added to adjust solids to 30% by weight. 1 L ore slurry samples were used for each flotation experiment, containing about 387 g of solid. Tomamine DA-16 (a synthetic ether diamine collector) and methyl isobutyl carbinol (MIBC, a frother) were diluted with deionized water to 1% aqueous solutions prior to use. Pearl cornstarch was obtained from Sigma-Aldrich (3.6 Mg/mol GPC analysis), oxidized corn starches were obtained from Grain Processing Corporation: D22F, 6.16 Mg/mol analysis, 6.6 Mg/mol estimation by Grain Processing Corporation); D17F, 1.04 Mg/mol analysis, 0.46 Mg/mol estimation by Grain Processing Corporation).

Preparation of the Depressant Samples

Starch solutions were prepared by adding NaOH (1 M, 15 mL) to starch (3.0 g) slurry in water (DI, 10 g) with stirring for 10 min. Solution mass was brought to 300 g by DI water addition with stirring for 1 h. The ratio starch:NaOH was 5:1. Starch solutions were used within 2 h of their preparation. All other chemical reagents were obtained from Fisher Scientific.

Flotation Tests

The flotation tests were performed in a 1-liter Metso laboratory flotation cell with continuous agitation at 800 rpm. For the flotation tests, the depressant (or DI water for blank) was added, pH was adjusted to 10.5 with 25% NaOH(aq), and conditioning was allowed for 5 minutes. The collector (220 g Tomamine DA-16/MT ore solids) was added and allowed to condition for 1 min. The frother (50 g MIBC/ton ore solids) was added simultaneously upon initiation of air flow. Four froth (tail) fractions were collected from times: 0 to 30 s; 30 to 60 s; 60 to 120 s; and 120 to 180 s. Air flow was stopped after 180 s. The four tailing samples and concentrate sample were dried, weighed, collected, and analyzed for Fe and Si by X-ray fluorescence (XRF). Initial feed concentrations were calculated based on the sum of all tail and concentrate analyses.

Efficacy can be evaluated by visual inspection of the plot of % Fe Recovery versus % Fe Grade. Iron recovery (% Fe Recovery) is the percent by mass of Fe in the concentrate from the total Fe in the feed. The % Fe Grade is the concentration by mass of the Fe in the total mass of a sample. Since silica removal is the objective, % Fe Recovery versus % $SiO_2$ Grade may be more relevant.

Position of the series cannot be directly compared since the feed grades (where recovery=100%) differ. These series are typically curves and require polynomial fits. However, under conditions targeted in this report, typical curves were not observed and linear fits were used. The slope of the linear regression was used as a numeric approximation of efficacy. The relative slope for a given series is its slope divided by the slope of the blank, expressed as a percent. As slopes or relative slopes approach zero, the change (or loss) in Fe recovery decreases, while the grade improvement increases. Therefore, slopes or relative slopes closer to zero have higher efficacy or performance. Relative slopes are plotted in bar charts for easy comparison, where values closest to zero indicate the highest efficacy.

Figure 3:
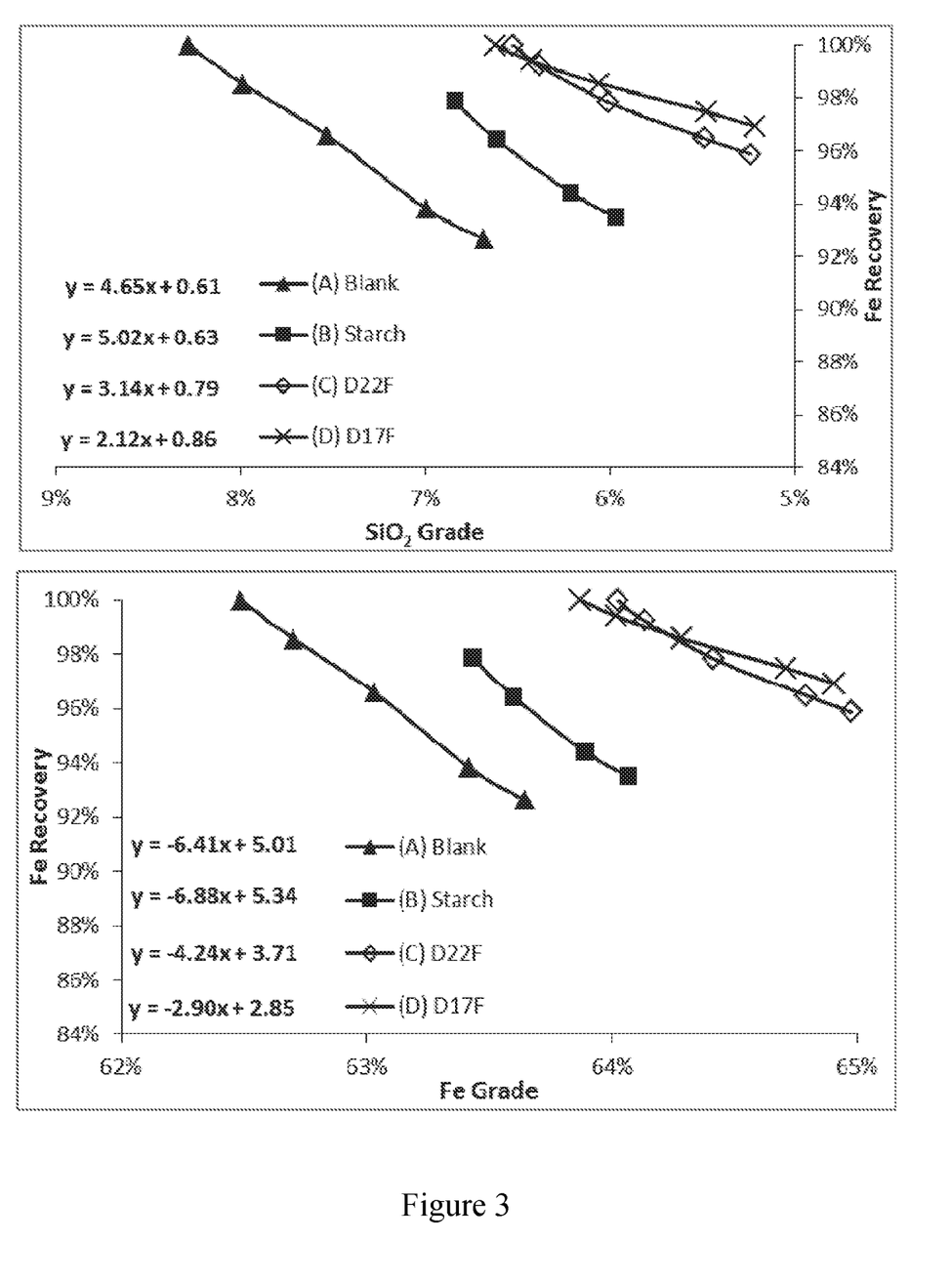
FIG. 3 shows a plot of the resulting $SiO_2$ grade (%) versus the Fe recovery (%) from flotation of iron ore treated with a blank (A), starch (B), or an exemplary depressant comprising moderately oxidized starch (C or D), as well as a plot of the resulting Fe grade (%) versus the Fe recovery (%) from the same experiments (bottom graph).
Figure 4:
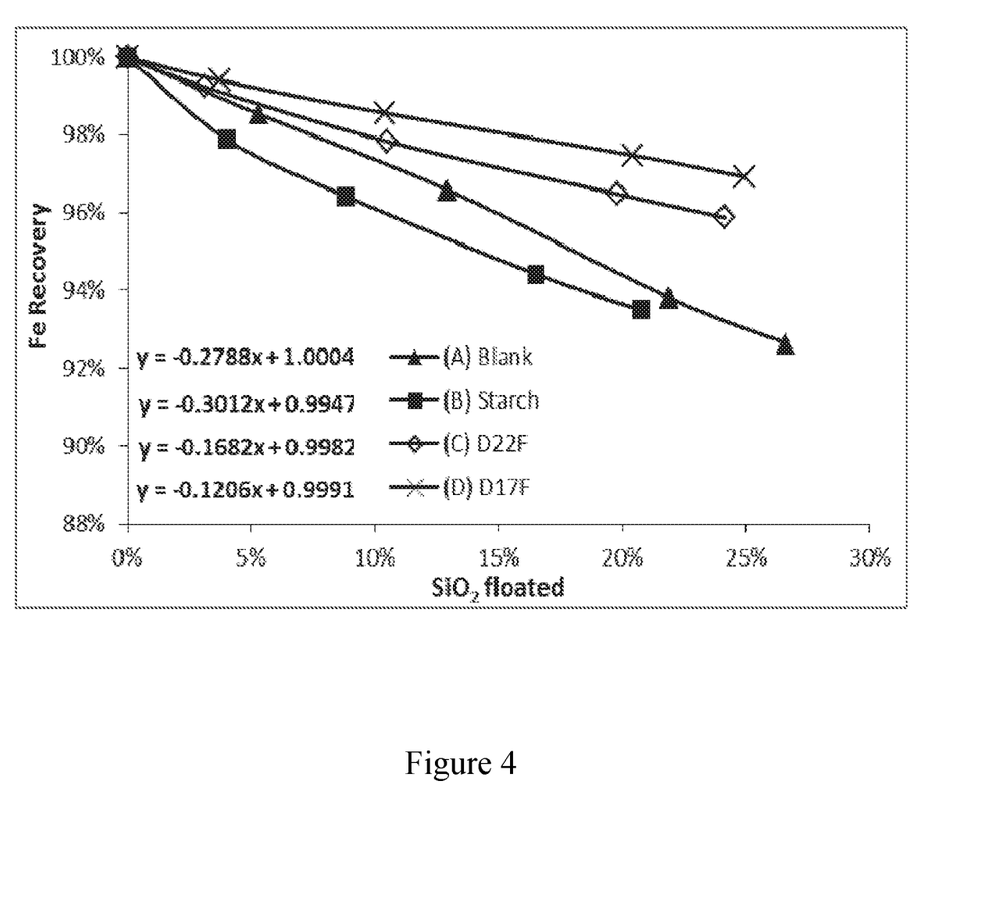
FIG. 4 shows a plot of the resulting $SiO_2$ floated (%) versus the Fe recovery (%) from flotation of iron ore treated with a blank (A), starch (B), or an exemplary depressant comprising moderately oxidized starch (C or D)
Figure 5:
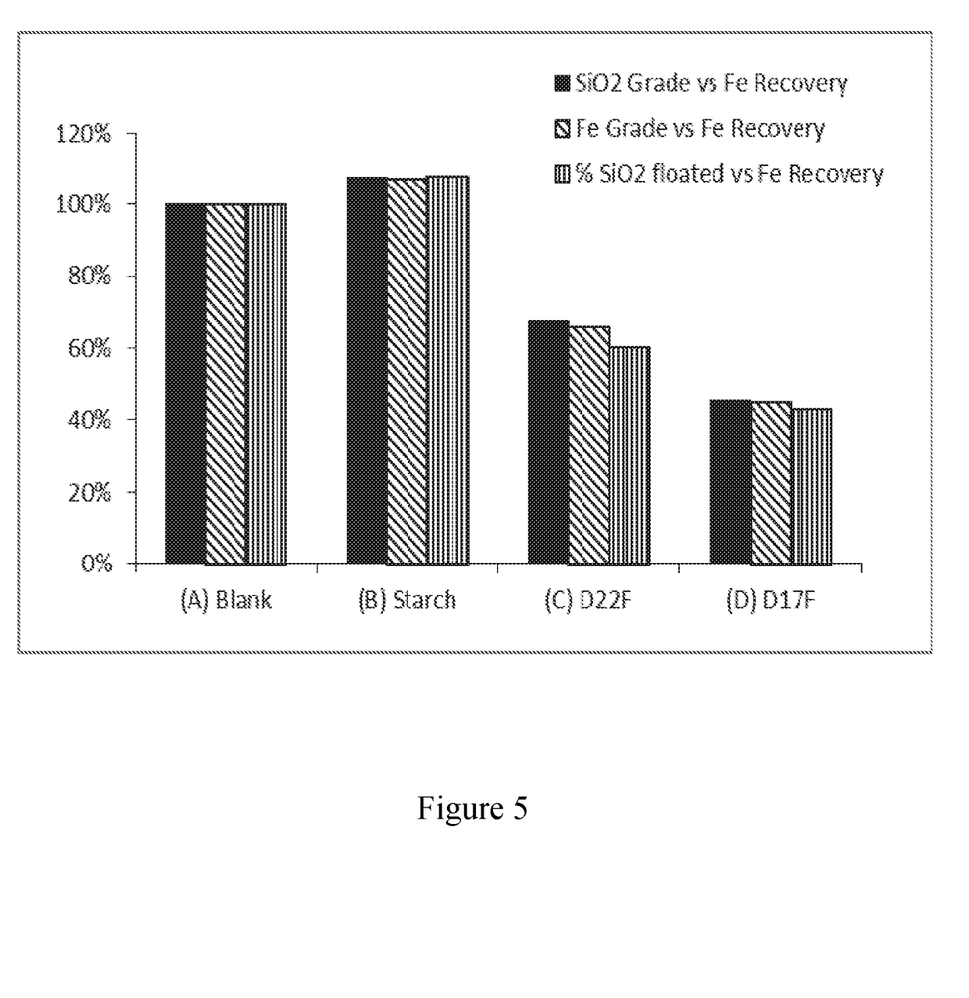
FIG. 5 is a bar graph depicting the relative slopes of $SiO_2$ grade (%) versus the Fe recovery (%), Fe grade (%) versus the Fe recovery (%), and $SiO_2$ floated (%) versus the Fe recovery (%) from flotation of iron ore treated with a blank (A), starch (B), or an exemplary depressant comprising moderately oxidized starch (C or D).

The results are shown in Tables 1-5 below and in FIGS. 3-5. Generally, the exemplary oxidized starch samples produced the highest recovery of iron and the most pure iron concentrate in the flotation tests, compared to the blank or pearl cornstarch samples.

TABLE 1

Flotation Conditions and Results for Experiments A-D

| Depressant | Blank (A) | Pearl Cornstarch (B) | GPC-D22F (C) | GPC-D17F (D) |
|---|---|---|---|---|
| Anionic Charge (mmol per gram of starch) | — — | 0.04 (pH 9.2) 0.21 (pH 10.3) | 0.06 (pH 6.7) 0.23 (pH 10.4) | 0.11 (pH 6.8) 0.27 (pH 10.4) |
| Molecular Mass (Mg/mol) | — | N/A | $6.16^a/6.6^b$ | $1.04^a/0.46^b$ |
| pH | 10.48 | 10.54 | 10.52 | 10.53 |
| Mass Recovery (%) | 91.0 | 92.4 | 94.5 | 95.4 |
| Relative Slope - % $SiO_2$ Grade vs. % Fe Recovery | 100% | 108% | 67.5% | 45.6% |
| Relative Slope - % Fe Grade vs. % Fe Recovery | 100% | 107% | 66.1% | 45.2% |
| Relative Slope - % $SiO_2$ Floated vs. % Fe Recovery | 100% | 117% | 62.4% | 44.3% |

$^a$ = Analyzed;
$^b$ = Manufacturer's estimation

TABLE 2

Flotation Data Table for Experiment A (Blank)

| | Discrete Analysis | | | | | Cumulative Concentrate (Calc.) | | |
|---|---|---|---|---|---|---|---|---|
| | Dry Solid (g) | $Fe_2O_3$ (%) | $SiO_2$ (%) | $Fe_2O_3$ (g) | $SiO_2$ (g) | Fe Grade (%) | $SiO_2$ Grade (%) | Fe Recovery (%) |
| Froth 1 | 6.89 | 72.40 | 24.40 | 4.99 | 1.68 | 62.70 | 7.99 | 98.54 |
| Froth 2 | 9.38 | 71.30 | 25.80 | 6.69 | 2.42 | 63.03 | 7.53 | 96.59 |
| Froth 3 | 12.70 | 74.70 | 22.40 | 9.49 | 2.84 | 63.42 | 7.00 | 93.81 |
| Froth 4 | 5.65 | 70.60 | 26.50 | 3.99 | 1.50 | 63.65 | 6.68 | 92.64 |
| Concentrate | 348.11 | 91.00 | 6.68 | 316.78 | 23.25 | | | |

TABLE 3

Flotation Data Table for Experiment B (Pearl Cornstarch)

| | Discrete Analysis | | | | | Cumulative Concentrate (Calc.) | | |
|---|---|---|---|---|---|---|---|---|
| | Dry Solid (g) | $Fe_2O_3$ (%) | $SiO_2$ (%) | $Fe_2O_3$ (g) | $SiO_2$ (g) | Fe Grade (%) | $SiO_2$ Grade (%) | Fe Recovery (%) |
| Froth 1 | 8.58 | 84.80 | 12.40 | 7.28 | 1.06 | 63.43 | 6.84 | 97.88 |
| Froth 2 | 6.48 | 77.00 | 19.50 | 4.99 | 1.26 | 63.60 | 6.61 | 96.42 |
| Froth 3 | 9.21 | 75.00 | 22.10 | 6.91 | 2.04 | 63.89 | 6.21 | 94.41 |
| Froth 4 | 4.38 | 71.10 | 25.50 | 3.11 | 1.12 | 64.07 | 5.97 | 93.50 |
| Concentrate | 350.21 | 91.60 | 5.97 | 320.79 | 20.91 | | | |

TABLE 4

Flotation Data Table for Experiment C (GPC-D22F)

| | Discrete Analysis | | | | | Cumulative Concentrate (Calc.) | | |
|---|---|---|---|---|---|---|---|---|
| | Dry Solid (g) | $Fe_2O_3$ (%) | $SiO_2$ (%) | $Fe_2O_3$ (g) | $SiO_2$ (g) | Fe Grade (%) | $SiO_2$ Grade (%) | Fe Recovery (%) |
| Froth 1 | 3.61 | 74.90 | 21.80 | 2.70 | 0.79 | 64.13 | 6.38 | 99.24 |
| Froth 2 | 7.15 | 70.30 | 26.40 | 5.03 | 1.89 | 64.41 | 6.00 | 97.83 |
| Froth 3 | 7.40 | 65.00 | 31.80 | 4.81 | 2.35 | 64.79 | 5.49 | 96.48 |
| Froth 4 | 3.38 | 63.90 | 32.70 | 2.16 | 1.11 | 64.98 | 5.24 | 95.88 |
| Concentrate | 367.93 | 92.90 | 5.24 | 341.81 | 19.28 | | | |

TABLE 5

Flotation Data Table for Experiment D (GPC-D17F)

| | Discrete Analysis | | | | | Cumulative Concentrate (Calc.) | | |
|---|---|---|---|---|---|---|---|---|
| | Dry Solid (g) | $Fe_2O_3$ (%) | $SiO_2$ (%) | $Fe_2O_3$ (g) | $SiO_2$ (g) | Fe Grade (%) | $SiO_2$ Grade (%) | Fe Recovery (%) |
| Froth 1 | 3.17 | 65.90 | 30.20 | 2.09 | 0.96 | 64.02 | 6.42 | 99.41 |
| Froth 2 | 4.82 | 61.50 | 35.20 | 2.96 | 1.70 | 64.29 | 6.06 | 98.56 |
| Froth 3 | 7.40 | 57.80 | 38.70 | 3.81 | 2.55 | 64.71 | 5.48 | 97.48 |
| Froth 4 | 3.38 | 60.80 | 35.70 | 1.96 | 1.15 | 64.91 | 5.21 | 96.92 |
| Concentrate | 367.93 | 92.80 | 5.24 | 340.92 | 19.14 | | | |

In the preceding procedures, various steps have been described. It will, however, be evident that various modifications and changes may be made thereto, and additional procedures may be implemented, without departing from the broader scope of the exemplary procedures as set forth in the claims that follow.

I claim:

1. A depressant comprising a moderately oxidized polysaccharide having about 0.05 to about 4.5 mmol of anionic charge per gram at a pH of about 6 to about 7, about 0.05 to about 5 mmol of anionic charge per gram at a pH of about 7 to about 8, about 0.2 to about 5 mmol of anionic charge per gram at a pH of about 10 to about 11.2, or about 0.2 to about 5 mmol of anionic charge per gram at a pH of about 10.5.

2. The depressant of claim 1, wherein the moderately oxidized polysaccharide has about 0.06 to about 0.11 mmol of anionic charge per gram at a pH of about 6 to about 7, or about 0.23 to about 0.36 mmol of anionic charge per gram at a pH of about 10 to about 11.2.

3. The depressant of claim 1, wherein the moderately oxidized polysaccharide is moderately oxidized starch.

4. A depressant comprising a moderately oxidized polysaccharide prepared by heating a mixture of a polysaccharide, one or more bases and one or more oxidizing agents in water.

5. The depressant of claim 4, wherein the polysaccharide is starch.

6. The depressant of claim 4, wherein the heating step is carried out at a temperature in the range of about 20° C. to about 100° C.

7. The depressant of claim 4, wherein the heating step is carried out for about 15 min to about 6 hours.

8. The depressant of claim 4, wherein the amount of water used in the treatment is the amount of water necessary to prepare a corn starch solution with a concentration of about 0.5% to about 50% by weight.

9. The depressant of claim 4, wherein the one or more bases comprises sodium hydroxide.

10. The depressant of claim 4, wherein the one or more oxidizing agents comprises hydrogen peroxide.

11. The depressant of claim 5, wherein the starch is cornstarch, the heating step is carried out for about 30 minutes to about 5 hours at a temperature in the range of about 55° C. to about 95° C., the amount of water used in the treatment is the amount of water necessary to prepare a corn starch solution with a concentration of about 0.5% to about 10% by weight, the one or more bases comprises sodium hydroxide, and the one or more oxidizing agents comprises hydrogen peroxide.

12. A composition comprising: one or more depressants according to claim 1, and a solvent.

13. The composition of claim 12, wherein the solvent is water.

14. A process for enriching a desired mineral from an ore comprising the desired mineral and gangue, wherein the process comprises carrying out a flotation process in the presence of one or more depressants according to claim 1.

15. The process of claim 14, wherein the desired mineral is an iron-containing mineral.

16. The process of claim 14, wherein the gangue comprises oxides of silica, silicates or siliceous materials.

17. The process of claim 14, wherein the flotation process is a reverse cationic flotation process.

18. The process of claim 14, wherein the process improves the grade of iron from iron ore such that the grade of the recovered iron is at least about 64%.

19. The process of claim 14, wherein the process reduces the amount of silica in the iron ore to less than about 10%.

20. The process of claim 14, wherein the flotation process is a reverse cationic flotation of iron ore.

* * * * *